United States Patent Office 3,676,224
Patented July 11, 1972

3,676,224
PHOSPHATING SOLUTION WITH SCALE
SUPPRESSING CHARACTERISTICS
Charles Thomas Snee, Willoughby, Ohio, assignor to The
Lubrizol Corporation, Wickliffe, Ohio
No Drawing. Filed Oct. 16, 1970, Ser. No. 81,518
Int. Cl. C23f 7/08
U.S. Cl. 148—6.15 Z               14 Claims

ABSTRACT OF THE DISCLOSURE

Modified zinc phosphate solutions for the treatment of metal surfaces, wherein the modifying metal is calcium, magnesium, lithium, beryllium, strontium, cadmium or barium (preferably calcium and/or magnesium), tend to form scale on the surfaces of phosphating apparatus. This scale formation is suppressed by the addition to the phosphating solution of a fluorine-containing complex ion such as fluosilicate or fluoborate.

---

This invention relates to new compositions of matter, and particularly to improved phosphating solutions for treatment of metal surfaces. Still more particularly, it relates to aqueous phosphating solutions characterized by a decreased tendency to form scale on the surfaces of phosphating apparatus, said solution containing as essential ingredients phosphate ion, zinc ion, one or more of calcium, magnesium, lithium, beryllium, strontium, cadmium and barium ions as modifying ions, and a fluorine-containing complex ion.

It has been known for some time that metal surfaces can be provided with a coating which is resistant to corrosion and which serves as an excellent paint base by treating such surfaces with an aqueous zinc phosphate solution. The coating is usually characterized by the presence of relatively large crystals. More recently, it has been discovered that the inclusion in a zinc phosphate bath of one or more of the calcium, magnesium, lithium, beryllium, strontium, cadmium and barium ions (hereinafter referred to as "modifying ions") permits the formation of a microcrystalline coating on the treated metal, which microcrystalline coating is even more effective for corrosion inhibition and as a paint base than the previously known crystalline coatings. Solutions of this type are disclosed, for example, in U.S. Pats. 3,090,709; 3,116,178; 3,144,360; 3,161,549; and 3,218,200, the disclosures of which are incorporated by reference herein. Such solutions will be referred to hereinafter as "modified zinc phosphate solutions."

It is frequently found, during the use of modified zinc phosphate solutions, that a hard scale is deposited on the surfaces of the apparatus in which the solutions are being used. The hardness and tenacity of this scale depends to some extent on the modifying ion; thus, the scale from a calcium-modified solution is much more difficult to remove than that from a magnesium-modified solution. Nevertheless, the formation of such scale is undesirable in any event and the necessity for its removal may result in an uneconomical amount of "down time" for the phosphating apparatus.

A principal object of the present invention, therefore, is to provide improved zinc phosphate solutions for the treatment of metal surfaces.

A further object is to provide modified zinc phosphate solutions which are characterized by little or no tendency to form scale on the surfaces of apparatus in which they are used.

A still further object is to provide a method for suppressing scale formation on phosphating apparatus.

Other objects will in part be obvious and will in part appear hereinafter.

The modified zinc phosphate solutions to which this invention pertains are well known in the art and are disclosed, for example, in the patents previously mentioned. These solutions also usually contain accelerators such as nitrate, nitrite, chlorate, chlorite, perchlorate or perborate ions or hydrogen peroxide. They may also contain additional substances which affect their action or the nature of the coating, such as nickel, cobalt, copper, cerium, ammonium, chloride, bromide, sulfate or borate ions or polyhydroxy aliphatic carboxylic acids, as well as ions such as sodium which are incidentally present in combination with others purposely added. The choice of which of these ingredients to use depends upon the conditions under which the phosphating solution is applied to the metal and upon the particular metal being coated. Thus, it is generally found that nitrate is not a particularly desirable accelerator for a solution to be used to coat zinc or galvanized metal, while nickel provides some advantageous properties on a zinc or galvanized surface but is unnecessary for treatment of ferrous metals.

The modifying ion may be any of those previously enumerated, or may be a mixture of two or more of them. Calcium and magnesium are most often used as modifying ions, and since the scale problem is much more severe with calcium than with magnesium, the present invention is particularly useful in connection with calcium-modified zinc phosphate solutions. It is sometimes advantageous to add a small amount of magnesium ion to a calcium-modified solution, so a second preferred embodiment of the invention involves the use of a zinc phosphate solution containing both calcium and magnesium ions.

The present invention is based on the discovery that the presence in a modified zinc phosphate solution of a fluorine-containing complex ion supresses or eliminates scale formation. By "fluorine-containing complex ion" is meant an ion, usually an anion, which contains fluorine in combination with at least one coordinating atom. Generally, 4 or 6 fluorine atoms are present for each coordinating atom, and the complex ion is planar, tetrahedral or octahedral in configuration. The identity of the coordinating atom is not critical from the standpoint of this invention but may have some effect upon the activity of the phosphating solution or the nature or color of the coating deposited on the metal. Illustrative fluorine-containing complex ions are fluoborate, fluosilicate, fluoaluminate, fluoantimonate and fluoberyllate; of these, fluosilicate and fluoborate are especially preferred with fluosilicate generally being most useful.

The amount of fluorine-containing ion present in the phosphating solution should be sufficient to provide about 0.05– 0.5 gram per liter of fluorine therein. When the phosphating solution is prepared from a plurality of concentrates, as is generally the case (for example, one concentrate will contain phosphoric acid, nitric acid and zinc oxide while a second concentrate will contain the modifying metal as the nitrate or chloride), the fluorine-containing complex ion is incorporated in the phosphate-containing concentrate.

The compositions of typical phosphating solutions of this invention are given in the following table. All figures represent grams per liter except for total acid and free acid, which are expressed in "points"; this term represents the number of milliliters of 0.1 N sodium hydroxide solution required to neutralize a 10-ml. sample of the phosphating solution. The indicator used to determine total acid is phenolphthalein; for free acid, it is modified methyl orange.

| Example | 1 | 2 | 3 | 4 | 5 | 6 |
|---|---|---|---|---|---|---|
| Phosphate | 8.4 | 4.94 | 5.16 | 5.89 | 7.5 | 12.4 |
| Nitrate | 30.75 | — | 16.00 | 20.8 | 20.1 | 25.2 |
| Nitrite | 0.05 | 0.05 | 0.05 | 0.05 | 0.06 | — |
| Chloride | — | 15.25 | — | 4.3 | 4.3 | — |
| Zinc | 1.14 | 1.62 | 1.14 | 1.26 | 1.55 | 1.09 |
| Magnesium | 4.16 | — | — | 0.40 | 3.78 | 0.55 |
| Calcium | — | 3.92 | 3.92 | — | 4.5 | 4.2 |
| Nickel | 1.1 | 0.43 | 0.17 | — | — | — |
| Fluoride ($SiF_6^{-2}$) | 0.24 | 0.12 | 0.20 | 0.26 | — | — |
| Fluoride ($BF_4^-$) | — | — | — | — | 0.09 | 0.35 |
| Total acid | 17.3 | 13.3 | 11.0 | 11.7 | 12.4 | 18.2 |
| Free acid | 1.0 | 1.1 | 1.1 | 1.2 | 1.4 | 2.1 |

In the accepted practice of phosphating metal articles, the metal surface is usually cleaned by physical and/or chemical means to remove any grease, dirt and oxides. It is frequently preferred that the chemical cleaning step include a titanium phosphate pretreatment of the type disclosed in U.S. Pat. 2,322,349. Alternatively, the phosphating solution may itself contain titanium phosphate.

The cleaned article is then rinsed with water and treated with the phosphating solution. The phosphating treatment may be by any of the commonly used techniques such as spraying, brushing, dipping, roller-coating and flow-coating; spraying is particularly effective with the solutions of this invention. The temperature of the phosphating solution may vary from about room temperature to about 240° F., conveniently about 150–180° F. and preferably about 160–165° F. The phosphating operation is carried out until a phosphate coating of the desired weight is obtained; this weight may be as little as 25 mg. per square foot of surface area but is generally about 50–1000 and preferably not more than about 300 mg. per square foot.

Upon completion of the phosphating operation, the metal article is generally rinsed with water and/or a hot, dilute aqueous solution of chromic acid. The chromic acid rinse appears to "seal" the phosphate coating and improve its utility as a base for the application of a paint or other siccative organic coating. A dilute aqueous solution of a metal chromate or dichromate, a chromic aicd-phosphoric acid mixture, or a mixture of chromic acid with a metal dichromate may be used in place of the aqueous chromic acid. Also useful, especially on galvanized surfaces, are solutions containing partially reduced chromic acid such as those described in U.S. Pats. 3,282,744 and 3,404,045.

The phosphating solutions of this invention are used as described above, in exactly the same way as comparable ones previously known which do not contain complex fluorides. In each instance, the solutions of this invention are characterized by little or no tendency to form scale on the phosphating apparatus, while the solutions of the prior art form scale of varying degrees of hardness and difficulty of removal.

What is claimed is:

1. An aqueous phosphating solution wherein the active ingredients consist essentially of
   phosphate ions;
   zinc ion;
   one or more of calcium, magnesium, lithium, beryllium, strontium, cadmium and barium ions as modifying ions;
   optionally, one or more of nitrate, nitrite, chlorate, chlorite, perchlorate and perborate ions and hydrogen peroxide as accelerators;
   optionally, one or more of nickel, cobalt, copper, cerium, ammonium, chloride, bromide, sulfate and borate ions and polyhydroxy aliphatic carboxylic acids as additional coating-affecting substances;
   and fluosilicate, fluoborate, fluoaluminate, fluoantimonate or fluoberyllate ions in an amount to provide about 0.05–0.5 gram per liter of fluoride in said solution.

2. A solution according to claim 1 wherein the active ingredients consist essentially of phosphate ion, zinc ion, nickel ion, said modifying ion, said accelerator, and fluosilicate or fluoborate ion.

3. A solution according to claim 2 which contains fluosilicate ion.

4. A solution according to claim 3 wherein the accelerator is at least one of nitrate and nitrite ions.

5. A solution according to claim 4 wherein the modifying ion is calcium ion.

6. A solution according to claim 4 wherein the modifying ion is magnesium ion.

7. A solution according to claim 4 wherein the modifying ions are calcium and magnesium ions.

8. A method for suppressing the formation of scale on the surfaces of phosphating apparatus in which there is used a phosphating solution wherein the active ingredients consist essentially of
   phosphate ion;
   zinc ion;
   one or more of calcium, magnesium, lithium, beryllium, strontium, cadmium and barium ions as modifying ions;
   optionally, one or more of nitrate, nitrite, chlorate, chlorite, perchlorate and perborate ions and hydrogen peroxide as accelerators;
   and optionally, one or more of nickel, cobalt, copper, cerium, ammonium, chloride, bromide, sulfate and borate ions and polyhydroxy aliphatic carboxylic acids as additional coating-affecting substances;
   which method comprises adding to said solution the fluosilicate, fluoborate, fluoaluminate, fluoantimonate or fluoberyllate ion in an amount to provide about 0.05–0.5 gram per liter of fluoride therein.

9. A method according to claim 8 wherein the active ingredients in said phosphating solution consist essentially of phosphate ion, zinc ion, nickel ion, said modifying ion and said accelerator, and the added ion is fluosilicate or fluoborate.

10. A method according to claim 9 wherein the added ion is fluosilicate.

11. A solution according to claim 10 wherein the accelerator is at least one of nitrate and nitrite ions.

12. A method according to claim 11 wherein the modifying ion is calcium.

13. A method according to claim 11 wherein the modifying ion is magnesium.

14. A method according to claim 11 wherein the modifying ions are calcium and magnesium ions.

References Cited

UNITED STATES PATENTS

| | | | |
|---|---|---|---|
| 3,597,283 | 8/1971 | Snee | 148—6.15 Z |
| 3,331,710 | 7/1967 | Lodeesen | 148—6.27 X |
| 3,382,111 | 5/1968 | Tongyai et al. | 148—6.16 |
| 3,109,757 | 11/1963 | Reinhold | 148—6.15 Z |
| 3,240,633 | 3/1966 | Gowman | 148—6.15 Z |
| 3,090,709 | 5/1963 | Henricks | 148—6.15 Z |

FOREIGN PATENTS

| | | | |
|---|---|---|---|
| 547,686 | 10/1957 | Canada | 148—6.15 Z |

RALPH S. KENDALL, Primary Examiner

U.S. Cl. X.R.

148—6.16